United States Patent [19]
Holst et al.

[11] Patent Number: 5,494,696
[45] Date of Patent: Feb. 27, 1996

[54] PARTIALLY DENATURED WHEY PROTEIN PRODUCT

[75] Inventors: Hans H. Holst, Videbaek; Arne Christensen, Herning; Kristian Albertsen, Videbaek; Lars D. Jensen, Vejle Ost; Mads C. Pedersen, Herning; Brian Thomsen, Holstebro, all of Denmark; Helmer Rasche, Burgdorf; Ulrich Hartmann, Witzenhausen, both of Germany

[73] Assignee: Danmark Protein A/S, Videbaek, Denmark

[21] Appl. No.: 347,296

[22] PCT Filed: May 5, 1993

[86] PCT No.: PCT/EP93/01093

§ 371 Date: Dec. 1, 1994

§ 102(e) Date: Dec. 1, 1994

[87] PCT Pub. No.: WO93/25086

PCT Pub. Date: Dec. 23, 1993

[30] Foreign Application Priority Data

Jun. 10, 1992 [DE] Germany ............................ 42 18 921.7
Apr. 21, 1993 [DE] Germany ............................ 43 13 014.3

[51] Int. Cl.⁶ .................................................. A23C 21/00
[52] U.S. Cl. .......................... 426/583; 426/656; 426/657; 426/589; 426/652
[58] Field of Search ...................... 426/656, 657, 426/583, 804, 589, 652

[56] References Cited

U.S. PATENT DOCUMENTS

| | | | |
|---|---|---|---|
| 4,140,808 | 2/1979 | Jonson | 426/583 |
| 5,188,842 | 2/1993 | Visser et al. | 426/656 |
| 5,215,777 | 6/1993 | Asher et al. | 426/565 |

FOREIGN PATENT DOCUMENTS

| | | |
|---|---|---|
| 041346 | 12/1981 | European Pat. Off. . |
| 186233 | 7/1986 | European Pat. Off. . |
| 347237 | 12/1989 | European Pat. Off. . |
| 2354715 | 1/1978 | France . |
| 2063273 | 6/1981 | United Kingdom . |
| WO92/20239 | 11/1992 | WIPO . |

Primary Examiner—Jeanette Hunter
Attorney, Agent, or Firm—Evenson, McKeown, Edwards & Lenahan

[57] ABSTRACT

A partially denatured whey protein product with a protein content of 65–95% by weight relative to the dry matter, a protein denaturization level of 55–80%, and a mean particle size in the range from 30 to 60 µm, in particular 40–50 µm. The product is suitable for use in foods as an additive with an emulsifying action and good organoleptic properties, particularly in cold-prepared emulsions.

16 Claims, No Drawings

PARTIALLY DENATURED WHEY PROTEIN PRODUCT

The present invention relates to a partially denatured whey protein product with good organoleptic properties which can be used as an additive to foods, and to its production.

Whey occurs as a liquid waste product in the production of cheese and casein. In addition to the lactose which is dissolved in it, whey also contains additional dissolved constituents, such as whey proteins, mineral salts, lactic acid and residues of fat or lipids and nonprotein nitrogen compounds.

In industrially applied processes for processing of whey to obtain various valuable whey components, whey is generally first separated by means of membrane ultrafiltration into a high-protein retentate fraction and into a high-lactose permeate fraction. The latter can be processed further to obtain lactose. From the protein-enriched retentate, a native, non-denatured whey protein concentrate can be obtained by means of further concentration and/or spray drying. Native whey protein concentrates may be used as food additives and feed additives. Thus non-denatured whey protein concentrate may be added, for example, to foods, such as tonic beverages, for the purpose of a protein enrichment. Whey protein concentrates may be used as emulsifying ingredients and egg substitutes in emulsified foods, such as mayonnaise and salad dressing. Although, in such cold-prepared emulsions, native whey protein concentrates may have emulsifying effects which are similar to those of egg yolk, the emulsions which are prepared in this manner lack the consistency and the pleasantly creamy taste sensation of the products produced with egg yolk so that the quality of such products is not satisfactory.

Whey proteins may also be used in a denatured form as additives for foods and feed products. Denatured whey protein products may be obtained, for example, by heat denaturation of whey or high-protein whey fractions in a slightly acidic pH-range and subsequent separation of the denatured proteins by centrifugation or spray drying. In this case, depending on the type of isolation, denatured proteins are obtained with mean particle sizes of between 25 and 200 μm. These denatured whey proteins may be used, for example, as skimmed-milk substitutes in the food industry, such as the baked goods industry. However, denatured whey proteins of this type have the disadvantage that they give the food produced with them a sandy, gritty taste sensation. Naturally, such a sandy taste is particularly undesirable in emulsions, such as mayonnaise, salad dressings and ice cream. European Patent Document No. 0 250 623 describes a macrocolloid which is made of denatured whey protein having a particle size in the range from 0.1 to 2.0 μm, as well as its production, and it is indicated that such a small particle size of the denatured whey protein is required in order to avoid a sandy taste sensation and achieve fat-like organoleptic properties.

The present invention is based on the object of providing new whey protein products with a high protein content and good organoleptic properties for use as food additives which, in particular, are suitable as ingredients of cold-prepared emulsions, such as mayonnaise, salad dressings, sausage meat and ice cream.

It has now been found that the new partially denatured whey protein products have excellent organoleptic properties and are well suited for use as emulsifying and viscosity-increasing ingredients of emulsions, such as mayonnaise and dressings.

The present invention therefore relates to a new partially denatured whey protein product with a protein content of 65 to 95% by weight of protein relative to the dry matter*, a protein denaturization level of 55 to 80% and a mean particle diameter* in the range of 30 to 60 μm, in particular 40 to 50 μm.

* Particle diameter and particle size distribution in a suspension of the whey protein product powder in ethanol determined by means of a laser scanner.
** Total protein, including NPN, determined according to the nitrogen estimation method according to Kjeldahl and calculated as % by weight nitrogen×6.38.
*** dry-substance content determined by drying at 102° C. to the constant weight.

The whey protein product will generally exist as a powder, as is produced, for example, after a spray drying, and may then have a moisture content of no more than 6% by weight, e.g. a water content of between 3 and 6, particularly 5 and 6% by weight.

In the case of the whey protein product according to the invention, there is preferably a particle size distribution* in which at least. 50% of the particles have a particle diameter in the range of from 20 to 70 μm, less than 10% of the particles having a particle diameter of below 10 μm, less than 1% of the particles having a particle diameter of below 5 μm, and less than 10% of the particles having a particle diameter of above 100 μm, and less than 1% of the particles having a particle diameter of above 200 μm.

The protein content of the product is very high and is between 65 and 95, particularly 70 and 95% by weight relative to the dry matter. Thus, the protein content may expediently be between 75 and 85, preferably between 80 and 84% by weight relative to the dry matter.

The denaturization level amounts to 55 to t30%; that is, that 55 to 80% by weight of the total whey protein is present as denatured protein****. Preferably, the denaturization level of the whey protein product is 60 to 75%, particularly approximately 70±2%.

**** denaturized protein is determined as that proportion of the protein which settles out as a precipitate at pH 4.6.

In addition to the partially denatured whey protein, the whey protein product may also contain lactose in amounts of up to 20% by weight relative to the dry matter. The lactose content may vary depending on the protein content of the product and may, for example, be between 0.5 and 20% by weight, preferably 3 to 6% by weight, relative to the dry matter. In addition, milk fats may also be contained in amounts of up to 17% by weight, particularly 5 to 8% by weight, relative to the dry matter. The whey protein product may also contain valuable mineral salts of the whey in amounts corresponding to an ash content of 2 to 6, preferably less than 4% by weight, relative to the dry matter. Valuable non-protein nitrogen compounds (=NPN*****) may be contained in amounts of between 4 and 8% by weight relative to the dry matter.

***** The content of nitrogen compounds which is not precipitable by 12%-trichloroacetic acid is determined as the NPN.

Suspended in water, the whey protein product according to the invention has a pH-value in the range of between>7.0 and 8.0, preferably in the range of between>7.0 and 7.5, particularly between 7.1 and 7.3.

According to the invention, the partially denatured whey protein product can be obtained in that a) a protein-enriched, lactose-reduced whey retentate, which is concentrated to a dry-material content of 25 to 35% by weight and has a protein content which is enriched to 65 to 95, particularly 70 to 95% by weight relative to the dry matter and a lactose content which is reduced to<20% by weight relative to the dry matter, is separated from whey, b) the resulting protein-enriched concentrated whey retentate is converted by the addition of water and diluted lye to a diluted whey retentate with a dry-matter content of 10 to 20% by weight and a pH-value in the range of between>7.0 and 8.0, c) the resulting diluted, whey retentate is preheated to a temperature of at least 50° C. which is below the coagulation point of the whey proteins, is then guided through a homogenizer, and is subjected therein, during a residence time which is sufficient for the denaturization of 55 to 80% of the protein content, to a denaturizing temperature which is generated by the simultaneous introduction of steam, while being homogenized at the same time, and d) the homogenized product obtained in process step c) is subjected immediately afterwards to a spray drying.

Sweet whey or sour whey may be used for producing the partially denatured whey protein product. The pH-value and the composition of the starting whey may vary slightly depending on the origin of the whey. Generally, the whey has a dry matter content of approximately 4 to 6% by weight. The dry matter contains approximately 65 to 80% by weight lactose, 8 to 15% by weight proteins, 3 to 4% by weight NPN-compounds, 0 to 3% by weight milk fats and minerals salts corresponding to an ash content of 8 to 15% by weight.

In process step a), the whey is separated according to known methods, for example, by ultrafiltration/diafiltration, into a protein-enriched, lactose-reduced whey retentate and into a protein-reduced, lactose-enriched whey permeate which can be processed further to recover lactose.

Any filter system which has a low permeability for proteins and fat and a high permeability for lactose, water, mineral salts and acids is suitable for the separation of the protein-enriched whey retentate. For example, an ultrafiltration/diafiltration which uses semipermeable membranes with a molecular weight exclusion limit in the range of 15,000–25,000, in particular approximately 20,000, Dalton is advantageous. Known polysulfone membranes, ceramic membranes or carbon membranes may be used as the membranes. Polysulfone membranes with the above-mentioned molecular weight exclusion limit are particularly suitable. The ultrafiltration may be carried out with membrane modules of many different constructions, such as plate modules or spiral modules, in which case several series-connected modules may be combined to form a separating device.

The ultrafiltration is carried out under conventional conditions for ultrafiltration of whey. Advantageously, a transmembrane pressure in the range of from 4 to 6 bar and a volume flow across of the membrane in the range of 15 to 175 l/min/m$^2$ membrane surface can be used. The ultrafiltration may take place at temperatures between 10° and 60° C., preferably between 10° and 20° C. In order to achieve the highest possible enrichment of the protein and a correspondingly high reduction of the lactose in the residue, the ultrafiltration may be carried out completely or partially as a diafiltration with the addition of water, particularly demineralized or dialyzed water.

In the process step, the whey retentate is concentrated to such an extent that a dry-matter content of 25 to 35% by weight is achieved. The protein content may thereby be enriched to 65 to 95, particularly 70 to 95% by weight, preferably 75 to 85% by weight, relative to the dry matter. Depending on the desired protein content, the lactose content will be reduced to below 20% by weight, preferably below 10% by weight, relative to the dry matter. To achieve products with very high protein contents, the lactose content may be reduced to a range of from 3 to 6% by weight relative to the dry matter.

In this case, the volume of the whey retentate solution is reduced to 1 to 3% of the volume of the used whey.

In process step b), the protein-enriched concentrated whey retentate is diluted with water again, particularly with demineralized water and is adjusted by the addition of diluted lye, particularly a diluted alkali metal hydroxide solution, such as soda lye, to a slightly alkaline pH-value, for example, in the range between>7.0 and 8.0, preferably between>7.0 and 7.5, particularly in the range between 7.1 and 7.3. In this case, the concentrated whey retentate is mixed with so much water that a diluted whey retentate solution is obtained with a dry matter content in the range of from 10 to 20, preferably 10 to 15% by weight.

As a result of the combination according to the invention of the extensive concentration and volume reduction occurring in the first process step during the obtaining of the whey retentate and the subsequent redilution, a whey retentate solution is obtained which can be further processed without problems and has the high protein content according to the invention in the dry matter.

To partially denature the protein content according to process step c), the diluted whey retentate is first preheated to a temperature below the coagulation point of the whey proteins which is at least 50° C., for example, to a temperature of 50° to 70° C., particularly approximately 60° C. The viscosity can be favorably influenced by degasifying the solution in a known manner before the heating.

The protein content of the preheated diluted whey retentate will then be partially denatured by means of heat under homogenizing conditions in that the diluted preheated whey retentate is guided through a homogenizer in which it is heated during a residence time which is sufficient for achieving the desired level of denaturization to temperatures which have a denaturizing effect while it is homogenized at the same time.

The partial denaturization takes place at temperatures of at least 70° C., for example, at temperatures between 75° and 98° C., preferably between 80° and 90° C. The heating takes place in the homogenizer by the introduction of steam directly into the whey retentate to be denatured.

The partial denaturization by heat may be carried out in homogenizers which are known per se if they are equipped for the simultaneous introduction of steam and develop a sufficiently extensive homogenizing effect in order to avoid the formation of larger aggregates with mean particle diameters above the above-mentioned range during the denaturization by heat. In particular, homogenizers are suitable in which the product passing through is subjected to high mechanical shearing effects, such as homogenizers known from U.S. Pat. No. 4,744,521. In order to adjust the required residence time of the diluted whey retentate under the denaturization conditions, the diluted whey retentate is expediently pumped in a circulating manner through a pipe loop containing the homogenizer. The flow rate of the product through the pipe must in this case be kept sufficiently high in order to avoid deposits on the pipe walls and to ensure a sufficiently low viscosity of the pseudoplastic liquid. Generally, this is ensured when the flow rate is at least 2 m/s.

The holding time of the diluted whey retentate under denaturizing conditions is selected such that a denaturization level of the whey protein of 55 to 80%, preferably 60 to 75%, particularly 70±2% is achieved. The required holding times may naturally be varied depending on the denaturization temperature and the desired denaturization level. However, generally, holding times in the range of 80 to 600 s, particularly 200 to 400 s are suitable.

The homogenized product which occurs in the partial denaturization step c) is spray dried immediately afterwards. In this case, the interval between the partial denaturization and the spray drying must be kept as short has possible. In a manner known per se, the spray drying may take place using known spray dryers in the case of which the product to be dried is sprayed into the drying zone.

Since the spray drying is advantageously carried out immediately following the partial denaturization, the product leaving the partial denaturization zone is expediently conveyed directly into a spray dryer, such as a spray drying tower, whose feed line is expediently coupled directly to the outlet from the denaturization zone. The hot air required fox the drying can be introduced into the spray dryer with an entrance temperature in the range of from 150° to 180° C. In order to achieve a fast drying, the amount of homogenized product to be introduced into the spray drying tower is expediently controlled such that an exit temperature of from 80° to 85° C. is reached.

The new, partially denatured whey protein product may be used in all areas of the food industry as a valuable protein additive with emulsifying properties. It is distinguished by properties which are favorable for the processing in food, particularly properties which are favorable for the processing in emulsified food which can be prepared cold, such as mayonnaise or salad dressings or meat mixtures or ice cream, and is therefore suitable as a valuable protein additive to food. The new product is particularly advantageous when used as an emulsifying and viscosity-increasing constituent of emulsified foods which can be prepared cold, for example, as an emulsifying agent and egg yolk replacement in mayonnaise and dressings. Mayonnaise classically contains four main ingredients: oil, vinegar, water and egg yolk. Whey proteins may be used in mayonnaise and dressings as emulsifying agents in order to completely or partially replace the egg yolk. In this case, the new, partially denatured whey protein product not only has an excellent effect as an emulsifying agent, it is also distinguished by the fact that—in contrast to whey protein which is not denatured—it considerably increases the viscosity of the emulsified product and has an excellent influence on its organoleptic properties and provides the product with a pronounced creamy constitution with a low-fat glaze.

These properties of the new partially denatured whey protein product which promote the organoleptic product quality are so pronounced that in oil-in-water emulsions, such as mayonnaise and dressings, which contain the new, partially denatured whey protein product as an emulsifying agent, up to 50% of the oil content may be replaced by water without loss of the consistency and/or the creamy constitution and of the fat-like glaze of the emulsion. The new, partially denatured whey protein therefore makes it possible to obtain mayonnaise and dressings with a reduced fat content while a good consistence and a good organoleptic quality are maintained.

It is surprising that the new, partially denatured whey protein product with a denaturization level of preferably about 80% and a mean particle diameter in the range of preferably 40 to 50 μm has such good organoleptic properties and is free of any sandy or gritty aftertaste, whereas denatured whey proteins with similar particle sizes, as known, because of their bad organoleptic properties, particularly their sandy sensation in the mouth, are unsuitable for use as an additive to mayonnaise which is produced cold. In comparison to egg yolk, the partially denatured whey protein also has the advantage that its emulsifying and viscosity-increasing properties are not lost even if the food product is subsequently heated, but instead are intensified.

Thus, the partially denatured whey protein is also suitable, for example, as a viscosity-increasing emulsifying agent for mixtures made cold of finely cut-up meat which are to be heated subsequently, such as sausage meat.

The following examples are intended to explain the invention in further detail without, however, limiting its scope.

EXAMPLE 1

Production of a partially denatured whey protein product with a denaturization level of 70% and a total protein content of approximately 82% by weight relative to the dry matter.

A) Whey having the following composition was used as the starting product:

| | |
|---|---|
| dry matter (= DM): | 5% by weight |
| lactose: | 75% by weight in DM |
| ash: | 9% by weight in DM |
| fat: | 1% by weight in DM |
| total protein: | 12% by weight in DM |
| NPN-compounds: | 3.5% by weight in DM |
| pH: | 6.3 |

For the diafiltration of the whey, an ultrafiltration system was used with series-connected plate modules having polysulfone membranes with a molecular weight exclusion limit of 20,000 Dalton. At a temperature of from 10° to 15° C. and a transmembrane pressure difference of 4 bar between the permeate side and the retentate side, the whey was guided at a flow rate of 20 l/min per plane through the ultrafiltration system, in which case, in the rear portion of the ultra filtration system, additional water was added in the amount of approximately 5% of the used whey.

An amount of protein-enriched concentrated whey retentate was obtained which corresponded to approximately 2.2% of the volume of the used whey. The whey retentate had the following composition:

| | | |
|---|---|---|
| dry matter (= DM): | | 30% by weight |
| lactose: | | 4% by weight in DM |
| ash: | below | 4% by weight in DM |
| fat: | | 7% by weight in DM |
| total protein: | | 82% by weight in DM |
| NPN-compounds: | | 6% by weight in DM |
| pH: | | 6.2 |

B) 150 kg of the resulting concentrated whey retentate were mixed with 225 kg demineralized water and an amount of diluted soda lye required for adjusting to a pH of 7.3. The resulting diluted whey retentate had the following composition:

| | | |
|---|---|---|
| dry matter (= DM): | | 12% by weight |
| lactose: | | 4% by weight in DM |
| ash: | below | 4% by weight in DM |
| fat: | | 7% by weight in DM |
| total protein: | | 82% by weight in DM |
| NPN-compounds: | | 6% by weight in DM |

C) The diluted whey retentate was heated in a flow heater of the plate heat exchanger type to a temperature of from 60° to 70° C. and was guided into an intermediate tank where it was left for a short time for the purpose of deaeration. Then the deaerated diluted whey retentate was guided into the denaturization zone in which it was pumped in a circulating manner through a pipe loop containing the homogenizer (Supraton S 200 machine of Dorr-Oliver Co. with a 3-step tooth and chamber fitting and injection inlets for the steam injection). At the same time as the whey retentate, filtered steam was introduced into the Supraton machine. The volume flow inside the loop was: set to 4,000 l/h at a flow rate of 60 l/h. The rotor speed of the Supraton machine was 3,500 rpm. The denaturization temperature was 80° C., and the residence time under denaturization conditions was 300 seconds.

D) The homogenized product flowing out of the denaturization circuit was pumped by means of a high-pressure pump directly into a spray drying tower (spray dryer of the firm NIRO with a centrifugal atomizer). The spray drying tower was heated with hot air of an inlet temperature of 175° C. and an outlet temperature of 83° C. The spray-dried whey protein product was obtained as a powder having the following composition:

| | |
|---|---|
| moisture: | 5.5 wt-% |
| total protein: | 78 wt-% (= 81.7 wt-% relative to DM) |
| denatured protein: | 70 wt-% relative to total protein |
| lactose: | 4 wt-% |
| ash: | below 4 wt-% |
| fat: | 7 wt-% |
| NPN-Compounds: | 6 wt-% |

The pH-value of an aqueous suspension of the product was 7.3.

The particle size determination in a suspension of the product in ethanol using a laser scanner (Malvern Series 2600 Particle Size Analyzer) yielded the following values:

Mean particle diameter approximately 45 μm; particle size distribution: less than 10% of the particles had a diameter of below 10 μm, and less than 10% of the particles had a diameter of above 100 μm.

The determined particle size distribution is listed in the following.

| Top Size in μm | % Under | Top Size in μm | % Under | Top Size in μm | % Under | Top Size in μm | % Under | Top Size in μm | % Under |
|---|---|---|---|---|---|---|---|---|---|
| 564 | 100 | 219 | 99.5 | 85.3 | 90.0 | 33.2 | 43.3 | 12.9 | 8.5 |
| 524 | 100 | 204 | 99.4 | 79.3 | 87.6 | 30.8 | 39.5 | 12.0 | 7.3 |
| 488 | 100 | 190 | 99.3 | 73.8 | 84.8 | 28.7 | 36.0 | 11.2 | 6.2 |
| 454 | 100 | 176 | 99.1 | 68.6 | 81.7 | 26.7 | 32.5 | 10.4 | 5.1 |
| 422 | 99.9 | 164 | 99.0 | 63.8 | 78.3 | 24.8 | 29.2 | 9.64 | 4.1 |
| 392 | 99.9 | 153 | 98.8 | 59.3 | 74.6 | 23.1 | 25.9 | 8.97 | 3.3 |
| 365 | 99.9 | 142 | 98.5 | 55.2 | 70.7 | 21.4 | 22.8 | 8.34 | 2.6 |
| 339 | 99.9 | 132 | 98.1 | 51.3 | 66.7 | 19.9 | 19.9 | 7.76 | 2.0 |
| 315 | 99.8 | 123 | 97.5 | 47.7 | 62.7 | 18.5 | 17.2 | 7.21 | 1.5 |
| 293 | 99.8 | 114 | 96.7 | 44.4 | 58.8 | 17.2 | 14.9 | 6.71 | 1.1 |
| 273 | 99.7 | 106 | 95.5 | 41.2 | 54.9 | 16.0 | 13.0 | 6.24 | 0.9 |
| 254 | 99.7 | 98.6 | 94.0 | 38.4 | 51.0 | 14.9 | 11.3 | 5.80 | 0.6 |
| 236 | 99.6 | 91.7 | 92.2 | 35.7 | 47.1 | 13.9 | 9.8 | | |

EXAMPLE 2

Production of a partially denatured whey protein product with a denaturization level of 70% and a total protein content of approximately 70% by weight relative to the dry matter.

A) Whey having the following composition was used as the starting material:

| | |
|---|---|
| dry matter (= DM): | 5% by weight |
| lactose: | 75% by weight in DM |
| ash: | 9% by weight in DM |
| fat: | 1% by weight in DM |
| total protein: | 12% by weight in DM |
| NPN-compounds: | 3.5% by weight in DM |
| pH: | 6.3 |

For the ultrafiltration of the whey, an ultrafiltration system was used with series-connected plate modules having polysulfone membranes with a molecular weight exclusion limit of 20,000 Dalton. At a temperature of from 10° to 15° C. and a transmembrane pressure difference of 4 bar between the permeate side and the retentate side, the whey was passed through the ultrafiltration system at a flow rate of 20 l/min per plate.

An amount of protein-enriched concentrated whey retentate was obtained which corresponded to approximately 2.5% of the volume of the used whey. The whey retentate had the following composition:

| | | |
|---|---|---|
| dry matter (= DM): | | 30 wt-% |
| lactose: | | 16 wt-% in DM |
| ash: | below | 5 wt-% in DM |
| fat: | | 6 wt-% in DM |
| total protein: | | 70 wt-% in DM |
| NPN-compounds: | | 6 wt-% in DM |
| pH: | | 6.2 |

B) 150 kg of the resulting concentrated whey retentate were mixed with 170 kg demineralized water and an amount of diluted soda lye required to adjust the pH to 7.3. The resulting diluted whey retentate had the following composition:

| | | |
|---|---|---|
| dry matter (= DM): | | 14 wt-% |
| lactose: | | 16 wt-% in DM |
| ash: | below | 5 wt-% in DM |
| fat: | | 6 wt-% in DM |
| total protein: | | 70 wt-% in DM |
| NPN-compounds: | | 6 wt-% in DM |

C) The diluted whey retentate was heated in a flow-through heater of the plate heat exchanger type to a temperature of from 60° to 70° C. and was passed to an intermediate tank where it was allowed to stand for a short time in order to deaerate it. Then the deaerated diluted whey retentate was conducted into the denaturizing zone in which it was pumped in a circuit through a pipe loop containing a homogenizer (Supraton S 200 machine from Dorr-Oliver Co. with a 3-step tooth and chamber fitting and injection inlets for the steam injection). Filtered steam was introduced into the Supraton machine simultaneously with the whey retentate. The volume flow inside the circuit was adjusted to 4,000 l/h at a throughput rate of 60 l/h. The rotor speed of the Supraton machine was 3,500 rpm. The denaturization temperature was 80° C., and the residence time under denaturizing conditions was 300 seconds.

D) The homogenized product discharged from the denaturizing circuit was transferred by a high-pressure pump directly into a spray drying tower (spray dryer from the firm NIRO having a centrifugal atomizer). The spray drying tower was heated by hot air having an inlet temperature of 175° C. and an outlet temperature of 83° C. The spray-dried whey protein product was obtained as a powder with the following composition:

| | |
|---|---|
| moisture: | 5.5 wt-% |
| total protein: | 67 wt-% (= 70.2 wt-% relative to DM) |
| denatured protein: | 70 wt-% relative to total protein |
| lactose: | 15 wt-% |
| ash: | below 5 wt-% |
| fat: | 6 wt-% |
| NPN-compounds: | 6 wt-% |

The pH-value of an aqueous suspension of the product was 7.3.

A particle size determination fin a suspension of the product in ethanol using laser scanner (Malvern Series 2600 Particle Size Analyzer) yielded the following values:

Mean particle diameter approximately 45 μm; particle size distribution: less than 10% of the particles had a diameter of under 10 μm, and less than 10% of the particles had a diameter of over 100 μm.

EXAMPLE 3

Production of a partially denatured whey protein product with a denaturization level of 70% and a total protein content of approximately 65% by weight relative to dry matter.

A) Whey having the following composition was used as the starting material:

| | |
|---|---|
| dry matter (= DM): | 5 wt-% |
| lactose: | 75 wt-% in DM |
| ash: | 9 wt-% in DM |
| fat: | 1 wt-% in DM |
| total protein: | 12 wt-% in DM |
| NPN-compounds: | 3.5 wt-% in DM |
| pH: | 6.3 |

For the ultrafiltration of the whey, an ultrafiltration system was used with series-connected plate modules having polysulfone membranes with a molecular weight exclusion limit of 20,000 Dalton. At a temperature of from 10° to 15° C. and a transmembrane pressure difference of 4 bar between the permeate side and the retentate side, the whey was passed at a flow rate of 20 l/min per plate through the ultrafiltration system.

An amount of protein-enriched concentrated whey retentate was obtained which corresponded to approximately 2.6% of the volume of the used whey. The whey retentate had the following composition:

| | |
|---|---|
| dry matter (= DM): | 30 wt-% |
| lactose: | 20 wt-% in DM |
| ash: | below 5 wt-% in DM |
| fat: | 6 wt-% in DM |
| total protein: | 65 wt-% in DM |
| NPN-compounds: | 6 wt-% in DM |
| pH: | 6.2 |

B) 150 kg of the resulting concentrated whey retentate were mixed with 170 kg demineralized water and an amount of diluted soda lye required to adjust the pH to 7.3. The resulting diluted whey retentate had the following composition:

| | |
|---|---|
| dry matter (= DM): | 14 wt-% |
| lactose: | 20 wt-% in DM |
| ash: | below 5 wt-% in DM |
| fat: | 6 wt-% in DM |
| total protein: | 65 wt-% in DM |
| NPN-compounds: | 6 wt-% in DM |

C) The diluted whey retentate was heated in a flow-through heater of the plate heat exchanger type to a temperature of from 60° to 70° C. and was conducted into an intermediate tank where it was allowed to stand for a short time in order to deaerate it. Then the deaerated diluted whey retentate was passed into the denaturizing zone in which it was pumped in a circuit through a pipe loop containing the homogenizer (Supraton S 200 machine from Dorr-Oliver Co. with a 3-step tooth and chamber fitting and injection inlets for injecting steam). Filtered steam was introduced into the Supraton machine simultaneously with the whey retentate. The volume flow within the circuit was adjusted to 4,000 l/h at a flow rate of 60 l/h. The rotor speed of the Supraton machine was 3,500 rpm. The denaturization temperature was 80° C., and the residence time under denaturizing conditions was 300 seconds.

D) The homogenized product discharged from the denaturizing circuit was pumped by a high-pressure pump directly into a spray drying tower (spray dryer from the firm NIRO with a centrifugal atomizer). The spray drying tower was heated with hot air having an inlet temperature of 175° C. and an outlet temperature of 83° C. The spray-dried whey protein product was obtained as a powder having the following composition:

| | |
|---|---|
| moisture: | 5.5 wt-% |
| total protein: | 62 wt-% (= 64.9 wt-% relative to DM) |
| denatured protein: | 70 wt-% relative to total protein |
| lactose: | 19 wt-% |
| ash: | below 5 wt-% |
| fat: | 6 wt-% |
| NPN-Compounds: | 6 wt-% |

The pH-value of an aqueous suspension of the product was 7.3.

The particle size determination in a suspension of the product in ethanol using a laser scanner (Malvern Series 2600 Particle Size Analyzer) resulted in the following values:

Mean particle diameter approximately 45 μm; particle size distribution: less than 10% of the particles had a diameter of under 10 μm, and less than 10% of the particles had a diameter of over 100 μm.

EXAMPLE 4

Use of the partially denatured whey protein product of Example 1 as an emulsifying agent in mayonnaise which can be prepared cold.

A mayonnaise was prepared while using the partially denatured whey protein product of Example 1 as an emulsifying agent, and this mayonnaise was compared with two comparison mayonnaises. As comparison mayonnaises, a standard mayonnaise with egg yolk as the emulsifying agent and a comparison mayonnaise with native non-denatured whey protein concentrate as the emulsifying agent were prepared. The composition and the properties of the resulting mayonnaises are compiled in the following Table 1.

Because of the properties of the partially denatured whey protein products which increase the viscosity and provide the mayonnaise with a creamy consistency with a good glaze, it becomes possible in mayonnaises emulsified with the product of the invention to replace considerable portion of the fat normally contained in mayonnaise with water.

In contrast, normal non-denatured whey protein concentrate lead to hardly any increase in the viscosity, and the mayonnaise prepared with this concentrate lacked the desired creamy consistency. This non-denatured whey pro-

TABLE 1

| | Mayonnaises | | |
|---|---|---|---|
| Composition in % by Weight | Mayon. Acc. to Invention With Partly Denatur. Whey Protein | Comparison Mayo. A Standard Mayo. With Egg Yolk | Comparison Mayo. B With Non-denat. Whey Protein Concentrate |
| Phase 1a | | | |
| Water | 35.40 | 35.40 | 35.40 |
| Salt | 0.50 | 0.50 | 0.50 |
| Variolac 83R* | 5.00 | 5.00 | 5.00 |
| Phase 1B | | | |
| Partly Denat. Whey Protein Product | 1.00 | — | — |
| Egg Yolk | — | 3.00 | — |
| Non-Denat. Whey Protein Product | — | — | 1.00 |
| Xanthene Gum | 0.10 | 0.10 | 0.10 |
| Ultratex 4 R** | 1.00 | 1.00 | 1.00 |
| Phase 2 | | | |
| Oil | 50.00 | 50.00 | 50.00 |
| Phase 3 | | | |
| Mustard | 2.50 | 2.50 | 2.50 |
| Spiced Vinegar | 4.50 | 4.50 | 4.50 |
| Properties | | | |
| Viscosity | 19,000 cP | 5,000 cP | 7,000 cP |
| Taste Sensation | Very Viscous, Creamy, Good Glaze Like Very Viscous Mayonnaise | Watery, Creamy, Good Glaze Like Relatively Viscous Dressing | Watery Good Glaze Like Low-Viscosity Mayonnaise |

*Variolac 83$^R$ = spray-dried whey permeate with 83% by weight Lactose, Manufacturer Danmark Protein A/S
**Ultratex 4$^R$ = modified starch, Manufacturer National Starch Corp.

The mayonnaises were produced as follows.

Phase 1a was charged into an emulsifying apparatus (emulsifying apparatus from Koruma Co., Type DH-V 60/10). Then phase 1b was mixed with a little oil and was added to phase 1a. The mixture was homogenized until an optimal viscosity was attained. For this purpose, homogenization was carried out for 0.5 minutes at full speed and for 1 minute at 80% of the speed of the apparatus. Then phase 2 was emulsified into phase 1, emulsifying time approximately 1 minute, and phase 3 was then added.

The mayonnaise produced with the partially denatured whey protein product as the emulsifying agent had a good creamy and viscous consistency with a good glaze and generated a pleasant fat-like feeling in the mouth. The viscosity of the mayonnaise was substantially increased in comparison to the standard mayonnaise.

tein concentrate is therefore not suitable as a fat substitute in cold-prepared emulsions.

EXAMPLE 5

Use of the partially denatured whey protein of Example 1 in a cold-prepared low-fat dressing (salad dressing).

A dressing containing the partially denatured whey protein product of Example 1 was prepared and compared with two comparison dressings. A standard dressing with a normal fat content and a low-fat comparison dressing without the partially denatured whey protein product were prepared as the comparison dressings. The composition of the dressings and their properties are compiled in the following Table 2.

TABLE 2

| | Dressings (Salad Dressings) | | |
|---|---|---|---|
| Composition in % by Weight | Dressing Acc. to Invention, Low Fat, With Partly Denat. Whey Product | Comparison Dressing A Standard Dressing Normal Fat Content | Comparison Dressing B Low-Fat |
| Phase 1a | | | |
| Water | 43.62 | 29.62 | 43.62 |
| Sugar | 9.00 | 9.00 | 9.00 |
| Salt | 0.50 | 0.50 | 0.50 |
| Spice Extract | 0.18 | 0.18 | 0.18 |
| Onion Powder | 1.50 | 1.50 | 1.50 |
| Phase 1b | | | |
| Egg Yolk | 3.00 | 3.00 | 3.00 |
| Partly Denat. Whey Protein Product | 1.00 | — | — |
| Xanthene Gum | 0.10 | 0.10 | 0.10 |
| Guar Gum | 0.10 | 0.10 | 0.10 |
| Phase 2 | | | |
| Oil | 15.00 | 30.00 | 15.00 |
| Phase 3 | | | |
| Spiced Vinegar | 6.00 | 6.00 | 6.00 |
| Cucumber | 10.00 | 10.00 | 10.00 |
| Tomato Paste | 10.00 | 10.00 | 10.00 |
| Mustard | 2.00 | 2.00 | 2.00 |
| Properties: | | | |
| Viscosity | 2.200cP | 2.300cP | 670 cP |
| Taste Sensation | good, creamy | good, creamy | watery, thin |

The preparation was carried out in the emulsifying apparatus described in Example 4 for the preparation of mayonnaise according to the method described in Example 4.

As the results indicated in Table 2 show, when only 1% by weight of the partially denatured whey protein product was added, half the fat in the dressing could be replaced by water without any loss of quality.

In contrast, a reduction of the fat content without the addition of partially denatured whey protein product resulted in a marked loss of quality and produced a thin watery product instead of the desired creamy dressing.

We claim:

1. A partially denatured whey protein product having a protein content of from 65 to 95 wt-% protein relative to total dry matter, a denaturization level of the protein of from 55 to 80%, and a mean particle diameter in the range from 30 to 60 μm.

2. A partially denatured whey protein product according to claim 1, having a mean particle diameter of from 40 to 50 μm.

3. A partially denatured whey protein product according to claim 1, having a particle size distribution in which:

at least 50% of the particles have particle diameters in the range from 20 to 70 μm;

less than 10% of the particles have particle diameters of under 10 μm;

less than 1% of the particles have particle diameters of under 5 μm;

less than 10% of the particles have particle diameters of over 100 μm; and less than 1% of the particles have particle diameters of over 200 μm.

4. A partially denatured whey protein product according to claim 1, having a protein content of from 70 to 95 wt-% relative to total dry matter.

5. A partially denatured whey protein product according to claim 4, having a protein content of from 75 to 85 wt-% relative to total dry matter.

6. A partially denatured whey protein product according to claim 1, having a fat content of from 5 to 8 wt-% relative to total dry matter.

7. A partially denatured whey protein product according to claim 6, having a lactose content of from 3 to 6 wt-% relative to total dry matter.

8. A partially denatured whey protein product according to claim 1, wherein said product is in powder form and has a water content of at most 6 wt-%.

9. A partially denatured whey protein product according to claim 1, which when suspended in water exhibits a pH-value in the range from greater than 7.0 to 7.5.

10. A partially denatured whey protein product according to claim 1, having a denaturization level of the protein of from 60 to 75%.

11. A process for producing a partially denatured whey protein product having a protein content of from 65 to 95 wt-% relative to total dry matter, a denaturization level of the protein of from 55 to 80%, and with a mean particle diameter of from 30 to 60 μm, said process comprising the steps of:

a) separating from whey a protein-enriched, lactose-reduced whey retentate, which is concentrated to a dry matter content of from 25 to 35 wt-% and which has a whey protein content which has been enriched to from 65 to 95 wt-% relative to total dry matter and a lactose content which has been decreased to less than 20 wt-% relative to total dry matter;

b) adding water and diluted lye to the protein-enriched lactose-reduced whey retentate in amounts sufficient to convert it to a diluted whey retentate having a dry matter content of from 10 to 20 wt-% and a pH-value in the range from >7.0 to 8.0;

c) preheating the diluted whey retentate to a temperature under the coagulation point of the whey protein, said temperature being at least 50° C., and then introducing the preheated whey retentate and steam into a homogenizer and simultaneously subjecting the preheated whey to homogenization and to a denaturizing temperature generated by the introduced steam for a residence time sufficient to denature from 55 to 80 wt-% of the whey protein, whereby a homogenized and partially denatured product is obtained; and d) directly thereafter spray drying the homogenized and partially denatured product.

12. A process according to claim 11, wherein the whey protein product has a protein content of from 70 to 95 wt-%, and the protein-enriched, lactose reduced whey retentate has a protein content of from 70 to 95 wt-% relative to total dry matter.

13. A process according to claim 11, wherein the whey protein product has a mean particle diameter of from 40 to 50 μm.

14. A method of emulsifying and increasing the viscosity of a food product comprising incorporating in said food product an effective emulsifying and viscosity increasing amount of a partially denatured whey protein powder having a protein content of from 65 to 95 wt-% protein relative to dry matter, a denaturization level of the protein of from 55 to 80%, and a mean particle diameter in the range from 30 to 60 μm.

15. A method according to claim 14, wherein the protein powder has a mean particle diameter in the range from 40 to 50 μm.

16. A method according to claim 14, wherein said food product is a cold-prepared food product selected from the group consisting of mayonnaise, salad dressings and meat filler mixtures.

* * * * *